United States Patent [19]

Boenigk et al.

[11] Patent Number: 5,283,045
[45] Date of Patent: Feb. 1, 1994

[54] SINTERABLE CARBON POWDER AND METHOD OF ITS PRODUCTION

[75] Inventors: Winfried Boenigk, Olfen; Hans-Dieter Behrens, Bochum; Andreas Niehoff, Haltern; Hans Spengler, Olfen, all of Fed. Rep. of Germany

[73] Assignee: Rutgerswerke AG, Frankfurt am Main, Fed. Rep. of Germany

[21] Appl. No.: 4,248

[22] Filed: Jan. 14, 1993

[30] Foreign Application Priority Data

Jan. 16, 1992 [DE] Fed. Rep. of Germany ....... 4200958

[51] Int. Cl.$^5$ .............................................. C01B 31/00
[52] U.S. Cl. .................. 423/445 R; 501/99; 106/472; 423/445 B
[58] Field of Search .............. 501/99; 106/472; 423/445; 201/7, 35

[56] References Cited

U.S. PATENT DOCUMENTS 4,071,604 1/1978 Schwemer .................... 423/445
4,117,051 9/1978 Ishikawa et al. ................ 264/29.1

FOREIGN PATENT DOCUMENTS 0056338 7/1982 European Pat. Off. .
0283211 9/1988 European Pat. Off. .

Primary Examiner—Karl Group
Assistant Examiner—Chris Gallo
Attorney, Agent, or Firm—Beveridge, DeGrandi, Weilacher & Young

[57] ABSTRACT

A carbon powder is disclosed with 40 to 75% by weight QI or more than 90% by weight TI, an optical anisotropy of less than 50% by volume, a start of softening between 200° and 300° C., and an oxygen content of more than 2% by weight, and which can be used for without binding agent the production of shaped carbon bodies. The carbon powder is produced by means of distillation from bituminous product at a maximum of 5 mbars and a final temperature of at least 400° C., grinding of the distillation residue to a particle size of less than 30 μm, and oxidation of the powder into the particle core.

7 Claims, No Drawings

SINTERABLE CARBON POWDER AND METHOD OF ITS PRODUCTION

INTRODUCTION AND BACKGROUND

The present invention relates to a sinterable carbon powder for the production of carbon bodies with a high density and strength without the use of binders, and also to a method of producing this carbon powder. In a further aspect, the present invention relates to a method of producing shaped carbon bodies without the use of a binder, and products obtained thereby.

The production of carbon bodies from calcined cokes with pitch binders by means of pressing, carbonization and optionally graphitizing is known. High densities are achieved if the coke is finely ground before being mixed with the binder. During the carbonization process, pores are produced in the carbon body by means of pyrolysis and distillation losses of the binder; the pores are reduced by further impregnating and carbonization processes. It is thus possible to produce graphite bodies with a density of up to 1.78 g/cm$^3$. Since the coke and the binder carbon exhibit different properties, stresses arise during the carbonizing and the graphitizing due to different shrinkage. These stresses result in defects on the boundary surfaces. For this reason, carbon bodies produced in this manner exhibit a relatively low strength.

Therefore carbon powders have been sought which exhibit suitable binding and sintering properties and which can thus be processed to carbon bodies without additional binders by means of pressing, carbonizing and optionally graphitizing.

EP-A-1,156,051 and EP-B-1,157,560 disclose carbon powders with a content of more than 95% by weight benzene-insoluble and more than 10% by weight quinoline-insoluble components which still contain 4 to 15% by weight evaporable components. Carbon bodies with a density of 1.85 to 2.05 g/cm$^3$ can be produced with these carbon powders at appropriately high compacting pressures by means of graphitizing. The carbon powder should still contain 2.5 to 15% by weight quinoline-soluble but benzene-insoluble components ($\beta$ resins).

Such a product is produced by means of the thermal treatment of coal-tar pitch at 350° to 600° C., solvent extraction of the pitch (in order to obtain a benzene-insoluble residue), and a new thermal treatment of the residue under inert gas at 250° to 500° C. Pitch mesophases are produced in the isotropic pitch matrix during the first thermal treatment. A carbon powder consisting of mesophases with a coating of $\beta$ resins remains after the second thermal treatment by means of the extracting of the benzene-soluble components of this matrix. Therefore this process also involves a two-component system with non-optimal properties of strength. A further disadvantage is the fact that the $\beta$ resin coating is not resistant to ageing, therefore the cohesion of the sinterable powder decreases with storage.

GB 1,492,832 suggests treating a pitch obtained by distillation, polymerization or condensation with an atomic H/C ratio of up to 0.8 with oxygen, sulfur or halogens. Compounds containing the latter can also be used. The treatment is carried out until a certain amount of these elements has reacted with the pitch. This is determined to be a function of its H/C ratio. The untreated pitch is at first pre-comminuted in order to be able to carry out the reaction in a simpler manner, and is subsequently ground down to a particle size of a maximum of 10 $\mu$m. Carbon bodies with a high density and strength are produced from this powder. In addition to the H/C ratio, the oxygen content and the coking residue, the content of quinoline-insoluble components is also indicated in the examples, which is approximately in a range of 7 to 95% by weight. The content of toluene-insoluble or $\beta$ resins is as little indicated as in the start of softening and therefore obviously plays no part in the invention.

The next development in the prior art is represented by EP-A-0,282,211. A pitch with a mesophase content of at least 50% by volume, preferably more than 75% by volume, especially more than 95% by volume, is ground to a grain fineness of less than 10 $\mu$m and oxidized in order to obtain a sinterable carbon powder. The oxidation is carried out, as in GB 1,492,832, as a function of the H/C ratio of the mesophase pitch. The grinding of the pitch to a particle diameter of less than 10 $\mu$m prior to the oxidation makes it possible to produce carbon bodies which exhibit approximately twice as high a bending strength as comparable carbon bodies (according to GB 1,492,832) under conditions which are otherwise the same.

The grinding fineness necessary for both methods is preferably achieved by wet grinding in a suitable solvent. A drying of the carbon powder is therefore necessary before the oxidation, which is quite expensive in the case of powders which are so fine, if no solvents are to be entrained in the subsequent process steps. A further disadvantage of the improved carbon powder according to EP-A-0,282,211 is the fact that very high pressures are required for producing dense and bend-resistant carbon bodies. Densities of more than 1.6 g/cm$^3$ in the carbonized bodies are only achieved at pressures of approximately 500 MPa. The bending strength of these bodies is then approximately 130 to 140 MPa. Such high compacting pressures can be realized into the interior of the powder charges only with difficulty in industrial processes, especially in the production of large formed bodies.

There was therefore the problem in the art of developing a sinterable carbon powder and a method of its production in which the cited disadvantages are avoided, so that superior carbon bodies can be produced at an industrially justifiable expense.

SUMMARY OF THE INVENTION

An object of the present invention was to solve the prior art problems by providing carbon powder which contains 40 to 75% by weight quinoline-insoluble components and more than 90% by weight (up to 99.5%) toluene-insoluble components, 8 to 16% by weight volatile components, exhibits an optical anisotropy of less than 50% by volume (down to 0%), and has a beginning of softening between 200° and 300° C., and an oxygen content of more than 2% by weight (up to 6%).

Such a carbon powder is produced by means of a process involving distilling a bituminous product (e.g. tars of pitches stemming from coal (i.e., hard coal coking) or aromatic mineral oil) at a pressure of 0.01 mbar up to a maximum of 5 mbars and a final temperature of at least 400° C. up to 500° C., dry grinding of the dry distillation residue obtained thereby to the desired particle size (1 to 30 $\mu$m, preferably 0.5 to 20 $\mu$m), and oxidizing the ground distillation residue at temperatures below the temperature at which caking of the powder begins until even the core of the individual particles no longer melts. Solvents are not utilized.

DETAILED DESCRIPTION OF THE INVENTION

The degree of grinding fineness is a function of the desired final product which is produced by shaping the carbon powder. In the case of carbon bodies or graphite bodies a grinding under 30 μm is as a rule advantageous. The grinding process is preferably designed to be continuous in order to obtain a very uniform distribution of particle size. The mill used for grinding is coupled with a classifying device. For purposes of the invention equipment known in the art is utilized.

In order to determine the required oxidation time, specimens of the ground distillation residue are oxidized at selected temperatures at different times and the carbon powders obtained are pressed into a desired shape to form test bodies and are carbonized. The oxidation time is selected to be the shortest time at which the pressed test body no longer swells or expands. This is a sure sign that the particles are no longer melting, even in the core. An oxidation beyond this time reduces the increase in density of the carbon powder during carbonization. Air or other oxidizing gases (e.g. oxygen, air enriched with oxygen or ozone, or nitrogen oxides) are preferred for use as the oxidizing agent.

The necessary oxidation conditions depend on many facts which are not always predictable (e.g., mean particle size, particle size distribution, oxidation gas, oxygen content in that gas, diffusion rates of oxygen, temperature, gas volume, and agitation of the powder). For given conditions, it is best to determine the required oxidation conditions experimentally. To a certain extent, either oxidation times or temperatures can be chosen; in general, oxidation temperature ranges from 180° to 300° C. and oxidation time ranges from 1 to 30 hours.

Whether the ground powder is agitated during oxidation depends on its amount. Small amounts can be oxidized in a fixed bed, larger amounts are agitated for a better accessibility to oxygen and for a better dissipation of reaction heat.

Dense carbon bodies with excellent mechanical properties can be produced from the carbon powder of the present invention by means of customary pressing, carbonizing and optional graphitizing. Even at relatively low compacting pressure (70 to 200 MPa), high densities and strengths which were not possible with previously known carbon powders can be unexpectedly achieved in the carbonized body. Even though the causes are not completely clear, and without being bound by theory, it is theorized that the positive properties (which are a sign for the homogeneous sintering and binding capacity of the powder) are traceable to the extremely high plasticity of the material. The sintering begins already at comparably low temperatures.

High performance carbon products are usually graphitized to lower the electrical and heat conductivity and to improve the machinability. The required temperature depends on the specific application. Carbonization and graphitization can be done in furnaces commonly used for the production of fine particle size carbon or graphite products.

The present invention is explained in detail in the following examples. The analyses of the materials were carried out according to the prevailing DIN (German Industrial Standard) specifications, but the solubility in quinoline was not determined at 80° C. but rather in boiling quinoline. This results in more readily reproducible values, especially in the case of materials with a high quinoline-insoluble content (QI). The melting point was determined in a capillary with the well known device according to Dr. Tottoli. The start of softening was determined in specimens weighing 90 mg (with a diameter of 6 mm) produced under a compacting pressure of 100 MPa with a sliding bar dilatometer at a load pressure of 3N under argon with a heating-up speed of 1 K/min.

EXAMPLES

Example 1

A coal-tar pitch with a softening point (Mettler) of 90° C., a content of quinoline-insoluble substance (QI) of 13.2% by weight and a content of toluene-insoluble substance (TI) of 32.7% by weight is distilled in a mechanically agitated evaporator at a pressure of 1 mbar to 460° C. The distillation residue has a melting point (Tottoli) of 350° C. and contains 57.4% by weight QI, 91.9% by weight TI, and 10.9% by weight volatile components. It is dry ground in a vibratory mill to an average particle size of 30 μm. The powder begins to cake at approximately 280° C. An oxidation temperature of only 180° C. is selected in order to reliably exclude a baking of the powder even in the exothermic reaction to be expected.

A part of the ground residue is oxidized in the presence of air at 180° C. and a specimen taken every hour. The specimens are pressed at 30 MPa to form test bodies which are heated under inert gas in an oven-type furnace with a temperature gradient of 1 K/min. to 1000° C. Pressure can vary from 70 to 200 MPa for isostatic pressing of larger bodies.

The expansion level decreases with the oxidation time. After an oxidation time of 10 hours, no more expansion of the specimen occurs. The required oxidation time is therefore 10 hours in order to render the powder infusible into the core of the individual particles. The remainder of the ground residue is therefore oxidized at 180° C. for 10 hours in air. The oxidized powder has a beginning of softening of 250° C., an oxygen content of 2.9% by weight, and an optical anisotropy of 15% by volume.

It contains 70.9% by weight QI, 94.5% by weight TI and 9.1% by weight volatile components. It is pressed at room temperature and a pressure 100 MPa to a cylindrical body with a diameter of 30 mm and a height of 10 mm. The density of this body is 1.25 g/cm$^3$ (generally the density depends on the particle size and the compaction pressure and normally ranges from 1.2 to 1.4 g/cm$^3$). The body is carbonized in nitrogen to 1000° C. Its density rises thereby to 1.72 g/cm$^3$. Its bending strength is 135 MPa. A second body is prepared in the same manner which, however is graphitized at a final temperature of 2,400° C. It has a density of 1.95 g/cm$^3$ and a bending strength of 125 MPa.

Example 2 (reference)

The same coal-tar pitch as in Example 1 is processed under the conditions described there but without an oxidation being carried out. The analytical values agree with those of the distillation residue of Example 1. The residue, ground to an average particle size of 30 μm, is pressed without oxidation directly as described in Example 1 to a carbon body with a density of 1.24 g/cm$^3$.

It expands during the carbonization process, so that further analytical values can no longer be determined.

Example 3 (reference)

The same coal-tar pitch as in Example 1 is thermally treated in an agitated container at 460° C. under inert gas until a mesophase pitch with an optical anisotropy of 70% by volume is obtained. The H/C ratio is determined at 0.48.

The mesophase pitch is ground to a maximum particle diameter of 10 μm and oxidized with R=0.24, as described in EP-A-0,283,211. The carbon powder obtained begins to soften at 370° C. and contains 93.2% by weight QI, 96.1% by weight TI, 10.2% by weight volatile components, and 1.5% by weight oxygen. A carbon body is pressed therefrom, as is described in Example 1. It has a density of 1.21 g/cm$^3$. After the carbonization the density rises to 1.67 g/cm$^3$ and its bending strength is 70 MPa. After the graphitizing, the density rises to 1.92 g/cm$^3$ but the bending strength falls to 55 MPa. In spite of lesser particle size and comparable shrinkage, the strength values are considerably lower than those found in Example 1.

Example 4 (reference)

The same coal-tar pitch as in Example 1 is distilled at 15 mbars under conditions which are otherwise the same as in Example 1. The distillation residue has a melting point of 330° C. and contains 47.4% by weight QI, 84.2% TI, and 12.9% by weight volatile components. It is ground as in Example 1 to an average particle size of 30 μm and the powder oxidized for 30 hours at 180° C. The powder has a start of softening at 310° C. and an optical anisotropy of 45% by volume. It contains 62.5% by weight QI, 96% by weight TI, 10.6% by weight volatile components, and 3.5% by weight oxygen. Carbon bodies are pressed therefrom, as in Example 1, which have a density of 1.23 g/cm$^3$. After the carbonization the density is 1.62 g/cm$^3$ and the bending strength 75 MPa.

After the graphitizing, the density rises to 1.83 g/cm$^3$ and the bending strength falls to 65 MPa. The higher pressure during the distillation results in a softer residue with a higher content of volatile matter and a lower QI and TI. In order to render the ground residue infusible down into the particle core, longer oxidation times are required.

The shifting of the start of softening to higher temperatures associated therewith shows that a deterioration of the sintering behavior has occurred. This is corroborated by the lesser increase in density during carbonization and by the low strength values.

Example 5

A coal tar is distilled as is described in Example 1. The distillation residue has a melting point of 340° C. and contains 57% by weight QI, 93.6% by weight TI and 11.3% by weight volatile components. It is ground to an average particle size of 2 μm. The powder begins to cake at 290° C. The ground residue is oxidized at 200° C. in a current of air for 24 hours. The determination of the optimum oxidation time took place in the same manner as the method described in Example 1. The powder obtained starts soften at 260° C., has an optical anisotropy of 10% by volume and an oxygen content of 3% by weight. It contains 71.2% by weight QI, 97.3% TI and 10.9% by weight volatile components. It is pressed as in Example 1 to carbon bodies which are carbonized and graphitized.

The density of the pressed green body is 1.26 g/cm$^3$. After carbonization to 1000° C. the density rises to 1.71 g/cm$^3$ at a bending strength of 175 MPa. The graphitized body has a density of 1.92 g/cm$^3$ and a bending strength of 155 MPa.

Example 6

A coal-tar pitch with a softening point of 107° C. and containing 10.5% by weight QI and 27.6% by weight TI, is distilled in a continuous manner at a pressure of 1 mbar and a temperature of the residue of 470° C.

The residue has a melting point of 330° C. and contains 53.2% by weight QI, 90.6% by weight TI and 11.7% by weight volatile components. It is ground in a continuous manner in a counter-jet impact pulverizer with integrated wind sifter, during which the material with a particle size of up to 10 μm is removed. The removed powder begins to bake at 290° C. It is oxidized in air 4 hours at 220° C. The optimum oxidation time was determined as in Example 1. The oxidized carbon powder begins to soften at 250° C. and an optical anisotropy of 20% by volume. It contains 66.8% by weight QI, 98.6% by weight TI, 9.4% by weight volatile components, and 2.8% by weight oxygen.

The carbon bodies produced therefrom as in Example 1 have a density of 1.27 g/cm$^3$ after the pressing. After carbonizing up to 1000° C., the bending strength is 160 MPa at a density of 1.77 g/cm$^3$. After the graphitizing at 2400° C., the bodies have a bending strength of 135 MPa at a density of 1.96 g/cm$^3$.

Further variations and modifications of the foregoing will be apparent to those skilled in the art and such variations and modifications are attended to be encompassed by the claims that are appended hereto.

German Priority Application P 42 00 958.8, filed on Jan. 15, 1992, is relied on and incorporated by reference.

What is claimed:

1. A sinterable carbon powder, wherein said powder contains 40 to 75% by weight quinoline-insoluble components and from more than 90 up to 99.5% by weight toluene-insoluble components, exhibits an optical anisotropy of less than 50% by volume, has a beginning of softening between 200° and 300° C., and has an oxygen content of from more than 2 up to 6% by weight.

2. The sinterable carbon powder according to claim 1, further comprising 8 to 16% by weight volatile components.

3. A method of producing a sinterable carbon powder, wherein said powder contains 40 to 75% by weight quinoline-insoluble components and from more than 90 to 99.5% by weight toluene-insoluble components, exhibits an optical anisotropy of less than 50% by volume, has a beginning of softening between 200° and 300° C., and has an oxygen content of from more than 2 up to 6% by weight; said method comprising:
   (a) distilling a bituminous product at a pressure from 0.01 to 5 mbars and a final temperature of at least 400° C. up to 500° C. to form a dry distillation residue,
   (b) dry grinding of said dry distillation residue from step (a) to a particle size of 1 to 30 μm to form a ground distillation residue, and
   c) oxidizing said ground distillation residue from step (b) at temperatures below the temperature at which caking of the powder begins until even the core of the individual particles no longer melts.

4. The method according to claim 3, wherein said particle size is 0.5 to 20 μm.

5. The method according to claim 3, wherein step (c) occurs at a temperature of from 180° to 300° C. for 1 to 30 hours.

6. A method of producing a sintered product without using a binder, said method comprising pressing, carbonization and optionally graphitizing of a sinterable carbon powder, wherein said powder contains 40 to 75% by weight quinoline-insoluble components and from more than 90 up to 99.5% by weight toluene-insoluble components, exhibits an optical anisotropy of less than 50% by volume, has a beginning of softening between 200° and 300° C., and has an oxygen content of from more than 2 up to 6% by weight.

7. A method of forming a sintered product without using a binder, said method comprising pressing, carbonization and optionally graphitizing of a sinterable carbon powder, wherein said powder contains 40 to 75% by weight quinoline-insoluble components and from more than 90 up to 99.5% by weight toluene-insoluble components, exhibits an optical anisotropy of less than 50% by volume, has a beginning of softening between 200° and 300° C., and has an oxygen content of from more than 2 up to 6% by weight.

* * * * *